United States Patent
Lee et al.

(10) Patent No.: US 9,098,522 B2
(45) Date of Patent: Aug. 4, 2015

(54) VERSION GARBAGE COLLECTION USING SNAPSHOT LISTS

(71) Applicants: Juchang Lee, Seoul (KR); Chang Gyoo Park, Seoul (KR); Yongjae Chuh, Seoul (KR); Jaeyun Noh, Seoul (KR); Michael Muehle, Walldorf (DE)

(72) Inventors: Juchang Lee, Seoul (KR); Chang Gyoo Park, Seoul (KR); Yongjae Chuh, Seoul (KR); Jaeyun Noh, Seoul (KR); Michael Muehle, Walldorf (DE)

(73) Assignee: SAP SE, Walldorf (DE)

(*) Notice: Subject to any disclaimer, the term of this patent is extended or adjusted under 35 U.S.C. 154(b) by 71 days.

(21) Appl. No.: 13/750,204

(22) Filed: Jan. 25, 2013

(65) Prior Publication Data

US 2014/0149353 A1    May 29, 2014

Related U.S. Application Data

(60) Provisional application No. 61/731,181, filed on Nov. 29, 2012.

(51) Int. Cl.
*G06F 17/30* (2006.01)

(52) U.S. Cl.
CPC ........ *G06F 17/3015* (2013.01); *G06F 17/3023* (2013.01); *G06F 17/30353* (2013.01); *G06F 17/30356* (2013.01)

(58) Field of Classification Search
CPC ..... G06F 17/30; G06F 12/02; G06F 17/3023; G06F 17/30353; G06F 17/30356; G06F 12/0253
USPC ........... 707/638, 661, 640, 813; 711/161, 162
See application file for complete search history.

(56) References Cited

U.S. PATENT DOCUMENTS

| | | | | |
|---|---|---|---|---|
| 5,701,480 | A * | 12/1997 | Raz | 718/101 |
| 7,290,019 | B2 * | 10/2007 | Bjorner et al. | 707/638 |
| 7,363,444 | B2 * | 4/2008 | Ji | 711/161 |
| 7,555,619 | B2 * | 6/2009 | Harris | 711/162 |
| 7,716,260 | B2 * | 5/2010 | Pannala et al. | 707/825 |
| 7,937,419 | B2 * | 5/2011 | Ylonen | 707/813 |
| 7,949,637 | B1 * | 5/2011 | Burke | 707/655 |
| 8,356,007 | B2 * | 1/2013 | Larson et al. | 707/610 |
| 8,805,788 | B2 * | 8/2014 | Gross et al. | 707/649 |
| 8,874,515 | B2 * | 10/2014 | Bodwin et al. | 707/638 |
| 2006/0155946 | A1 * | 7/2006 | Ji | 711/162 |
| 2006/0167960 | A1 * | 7/2006 | Lomet | 707/206 |

(Continued)

OTHER PUBLICATIONS

Chung et al. "Fast Memory Snapshot for Concurrent Programming without Synchronization" ICS. 2009.*

(Continued)

*Primary Examiner* — Dennis Truong
(74) *Attorney, Agent, or Firm* — Sterne, Kessler, Goldstein & Fox P.L.L.C.

(57) ABSTRACT

Systems, methods and computer program product embodiments for providing version garbage collection using snapshot lists are disclosed herein. Version garbage collection using snapshot lists includes storing, by at least one processor, versions of a record in a database table, the record comprising a record value and a version timestamp, storing, by the at least one processor, active snapshots in two levels of active snapshot lists, an active snapshot comprising a transaction identifier and a snapshot timestamp, determining, by the at least one processor, a minimum active snapshot from the active snapshots in the two levels of active snapshot lists and deleting, by the at least one processor, versions of the record having a version timestamp earlier than a snapshot timestamp of the minimum active snapshot.

15 Claims, 6 Drawing Sheets

(56) References Cited

U.S. PATENT DOCUMENTS

| | | | | |
|---|---|---|---|---|
| 2010/0293206 | A1* | 11/2010 | Ylonen | 707/813 |
| 2012/0102006 | A1* | 4/2012 | Larson et al. | 707/703 |
| 2013/0007073 | A1* | 1/2013 | Varma | 707/813 |
| 2013/0232310 | A1* | 9/2013 | Kruus | 711/162 |
| 2014/0149353 | A1* | 5/2014 | Lee et al. | 707/639 |

OTHER PUBLICATIONS

Bornea et al. "One-Copy Serializability with Snapshot Isolation under the Hood" 2011.*

Extended European Search Report for European Application No. 13194954, dated Apr. 10, 2014, 14 pages.

Weihl, "Distributed Version Management for Read-Only Actions," IEEE Transactions on Software Engineering, vol. SE-13, No. 1, Jan. 1, 1987, 10 pages.

Stonebraker, "The Design of the Postgres Storage System," Proceedings of the Thirteenth International Conference on Very Large Data Bases, Jan. 1, 1987, 19 pages.

Bernstein, et al., "Multiversion Concurrency Control," Concurrency Control and Recovery in Database Systems, Jan. 1, 1987, 24 pages.

Mohan, et al., "Efficient and Flexible Methods for Transient Versioning of Records to Avoid Locking by Read-Only Transactions," Proceedings of the 1992 ACM SIGMOD International Conference on Management of Data, Jun. 1992, vol. 21, Issue 2, 11 pages.

Agrawal, et al., "Modular Synchronization in Multiversion Databases: Version Control and Concurrency Control," Proceedings of the 1989 ACM SIGMOD International Conference on Management of Data, Jun. 1, 1989, 9 pages.

Bober, et al., "On Mixing Queries and Transactions via Multiversion Locking," Data Engineering, 1992, Proceedings of the $18^{th}$ VLDB Conference, Vancouver, British Columbia, Canada, Feb. 2-3, 1992, 11 pages.

* cited by examiner

VERSION GARBAGE COLLECTION USING SNAPSHOT LISTS

CROSS-REFERENCE TO RELATED APPLICATION

This application claims the benefit of 35 U.S.C. §119(e) of U.S. Provisional Patent Application No. 61/731,181, "Version Garbage Collection Using Snapshot Lists," filed Nov. 29, 2012, incorporated by reference herein in its entirety.

BACKGROUND

1. Field

The present embodiments are generally related to multi-version concurrency control and garbage collection of versions of records in an in-memory database system.

2. Background

Conventional database management systems have been optimized to perform on hardware with limited main memory, e.g. random access memory (RAM). These conventional database management systems have slower disk input/output (I/O) that serves as a bottleneck.

However, computer architecture has advanced so that that multi-core parallel processing is possible by processor cores communicating using RAM or a shared cache. In addition, RAM is no longer as limited a resource. Databases may now be stored entirely in RAM and thus disk access is no longer a limiting factor for performance. However, multi-core systems present other challenges.

Databases of online transaction processing systems have been modified to utilize multi-core parallel processor computer systems efficiently. In particular, these databases support parallel execution of transactions, are now located in-memory and are organized to be cache efficient. Although RAM has become voluminous, in multi-core parallel processing in-memory database systems, communication between processor cores requires storage of many versions of records and copies of a database. Each database update operation generates a new record version instead of overwriting an existing record that is already stored. The database system will eventually not have enough storage for each record version and execute garbage collection to "throw away" or consolidate not-to-be-used-anymore record versions. However, conventional multi-core parallel processing garbage collection protocols may be improved to reduce memory usage.

BRIEF SUMMARY

Briefly stated, the example embodiments include system, method and computer program product embodiments, and combinations and sub-combinations thereof, for providing version garbage collection using snapshot lists, e.g. fine-granular version garbage collection. According to embodiments, multi-core parallel processing in-memory database systems may execute table-wise timestamp based garbage collection by utilizing a global active snapshot list as well as local active snapshot lists.

In an embodiment, version garbage collection using snapshot lists includes storing, by at least one processor, versions of a record in a database table, the record comprising a record value and a version timestamp. In addition, the garbage collection includes storing, by the at least one processor, active snapshots in two levels of active snapshot lists, an active snapshot comprising a transaction identifier and a snapshot timestamp. Next, the at least one processor determines a minimum active snapshot from the active snapshots in the two levels of active snapshot lists. The garbage collection then includes deleting by the at least one processor, versions of the record having a version timestamp earlier than a snapshot timestamp of the minimum active snapshot.

Further features and advantages, as well as the structure and operation of various embodiments thereof, are described in detail below with reference to the accompanying drawings. It is noted that the disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate exemplary embodiments and, together with the description, further serve to explain the principles of the disclosure and to enable a person skilled in the relevant art(s) to make and use the contemplated and disclosed embodiments.

Features and advantages of embodiments of the present disclosure will become more apparent from the detailed description set forth below when taken in conjunction with the drawings. In the drawings, like reference numbers generally indicate identical, functionally similar, and/or structurally similar elements. Generally, the drawing in which an element first appears is indicated by the leftmost digit(s) in the corresponding reference number.

DETAILED DESCRIPTION

Introduction

The following detailed description refers to the accompanying drawings that illustrate exemplary embodiments consistent with this disclosure. Other embodiments are possible, and modifications can be made to the embodiments within the spirit and scope of the embodiments. Therefore, the detailed description is not meant to limit the embodiments. Rather, the scope of the embodiments is defined by the appended claims.

Example Hardware Architecture

Figure 1:
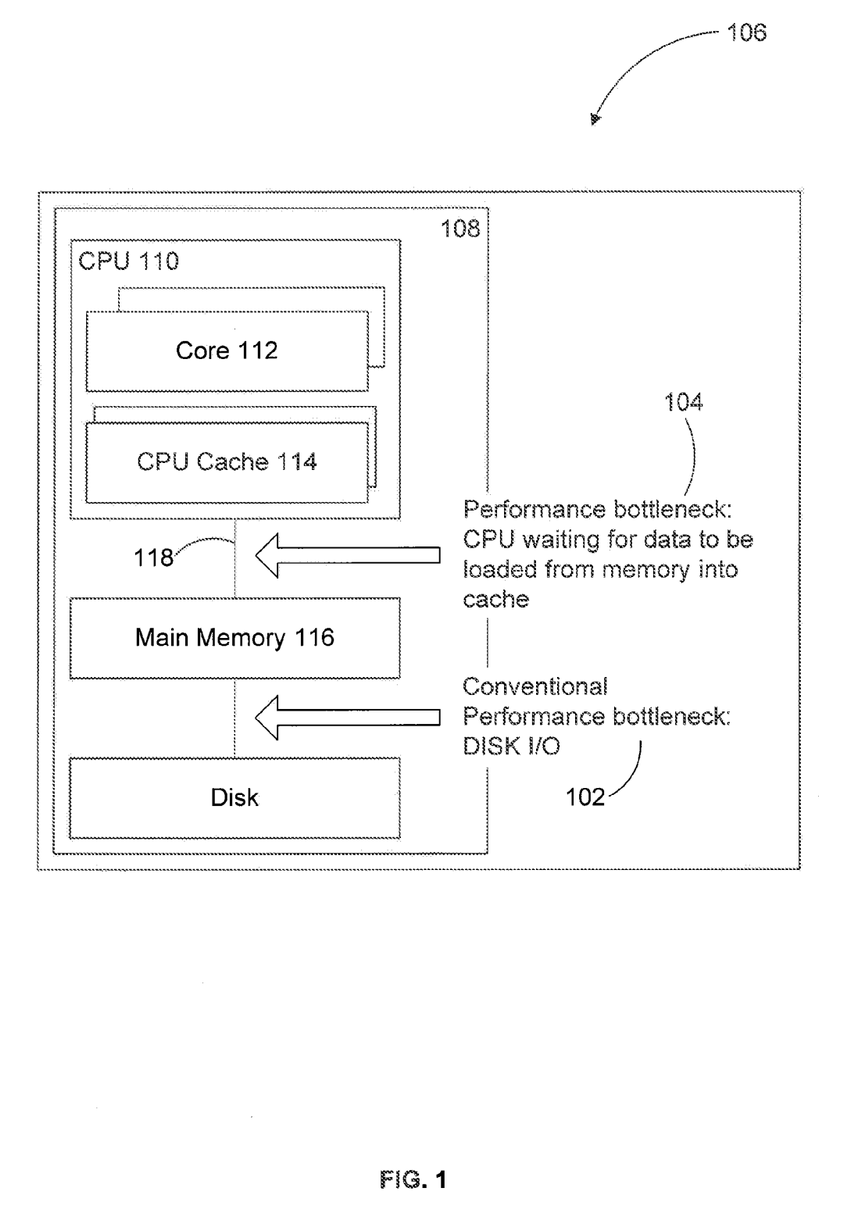
FIG. 1 illustrates a block diagram of database system hardware architecture according to example embodiments.

FIG. 1 shows a block diagram of a database system 106 according to example embodiments. The database system may be, but is not limited to, an in-memory column-store database system.

In conventional database systems, the focus is directed to optimizing disk access, by minimizing a number of disk pages to be read into main memory when processing a query. This bottleneck is shown in FIG. 1 at 102.

However, the performance bottleneck in multi-core parallel processor computer systems is found between a CPU cache and RAM. The processor cores wait for data to be loaded from RAM into the processor cache. This bottleneck is shown in FIG. 1 at 104. This bottleneck is addressed by making efficient usage of the CPU cache. As a number of processor cores increase, CPUs will continue to be able to simultaneously process increasingly more data.

As shown in FIG. 1, database system 106 may include a computer 108 having at least one processor (CPU) 110. As an example, the database system 106 in FIG. 1 is shown having one processor, but the database system is not limited to having one processor and may have two or more processors. As an example, CPU 110 in FIG. 1 is shown as having two cores 112, but the processor 110 may include less than two cores or more than two cores. The cores 112 may have a CPU cache 114 that is shared among the cores. Each core 112 may have a plurality of hardware contexts, e.g. threads. In addition, the computer 108 includes random-access memory (RAM) 116 which may include hundreds of GB or TBs of RAM. According to example embodiments, the database system 106 may be an in-memory column-store database system stored and executed within RAM 116. Thus, as opposed to conventional database systems stored on disk where disk access and speed presents a bottleneck, the RAM 116 of an in-memory database system presents a bottleneck for the faster cache 114. The RAM 116 and processor 110 may communicate via a bus 118.

Multi Version Concurrency Control

Multi version concurrency control (MVCC) is used by database management systems to provide concurrent access to a database. According to MVCC, data in the database is not overwritten, but rather when changes are to be made to the database, data is marked as obsolete, and a new version of data is added to the database. MVCC allows a plurality of users to have access to a snapshot of a database at a particular point in time. Changes made by each user will not be seen by other users until such changes are committed to the database, by adding new versions of data to the database. However, over time MVCC-based databases generate obsolete data and this obsolete data may need to be deleted or collected. The example embodiments provided below are applicable to any system that may include MVCC-based properties, such as database systems and transactional memory based systems.

According to example embodiments, MVCC is applicable to an in-memory column-store database system 106 having a plurality of processor cores 112, each capable of having a plurality of threads. MVCC may be used to implement updates to a database and to ensure consistent read operations. Thus, as noted above, updates to a database as a result of database transactions such as writing or deleting do not overwrite existing records, but rather insert new versions of records. As a result, a transaction may write a new version of a data item while concurrent transactions have read access to previous versions. A timestamp or similar mechanism may be associated with each version. The timestamp may be used to determine which versions are visible for transactions. Deletions may be implemented by inserting a deletion version or by some other mechanism that indicates that a previous version is no longer visible to subsequent transactions.

In addition, when transactions occur, the database may record a snapshot of the entire database. A database snapshot is a read-only static view of a database and is transactionally consistent as of the timestamp of the snapshot.

Isolation of concurrent database transactions from one another is important to ensure correct execution of the transactions. Without transactional isolation, it is possible that concurrent transactions may read an inconsistent intermediate state written by transactions or a state caused by a transaction that is later aborted (e.g. a dirty read). MVCC may be used to implement different transaction isolation levels such as transaction level snapshot isolation as well as statement level snapshot isolation. Transaction level snapshot isolation allows all statements of a transaction to see a same snapshot of a database. Thus, the snapshot includes all changes that were committed at a time the transaction started as well as changes made by the transaction itself. Transaction level snapshot isolation corresponds with a SQL level such as "repeatable read." Statement level snapshot isolation allows different statements in a transaction to see different snapshots of a database. Thus, each statement may see changes that were committed when execution of the statement started. This isolation level corresponds with a SQL level such as "read committed."

MVCC-based database systems produce a large number of versions of data records. "Old" versions of data records are no longer needed if they are no longer part of a snapshot that can be seen by any running transaction. These old versions of data records are obsolete and are to be removed from time to time to free up memory. This may be known as "garbage collection" or "version consolidation." This may occur asynchronously to an event that makes a version obsolete. Version consolidation may be executed as a regular background job or may be explicitly triggered when a size limit for version memory is exceeded, or manually triggered by an administrator.

Garbage Collection using Version Timestamps of Active Snapshots

Figure 2:
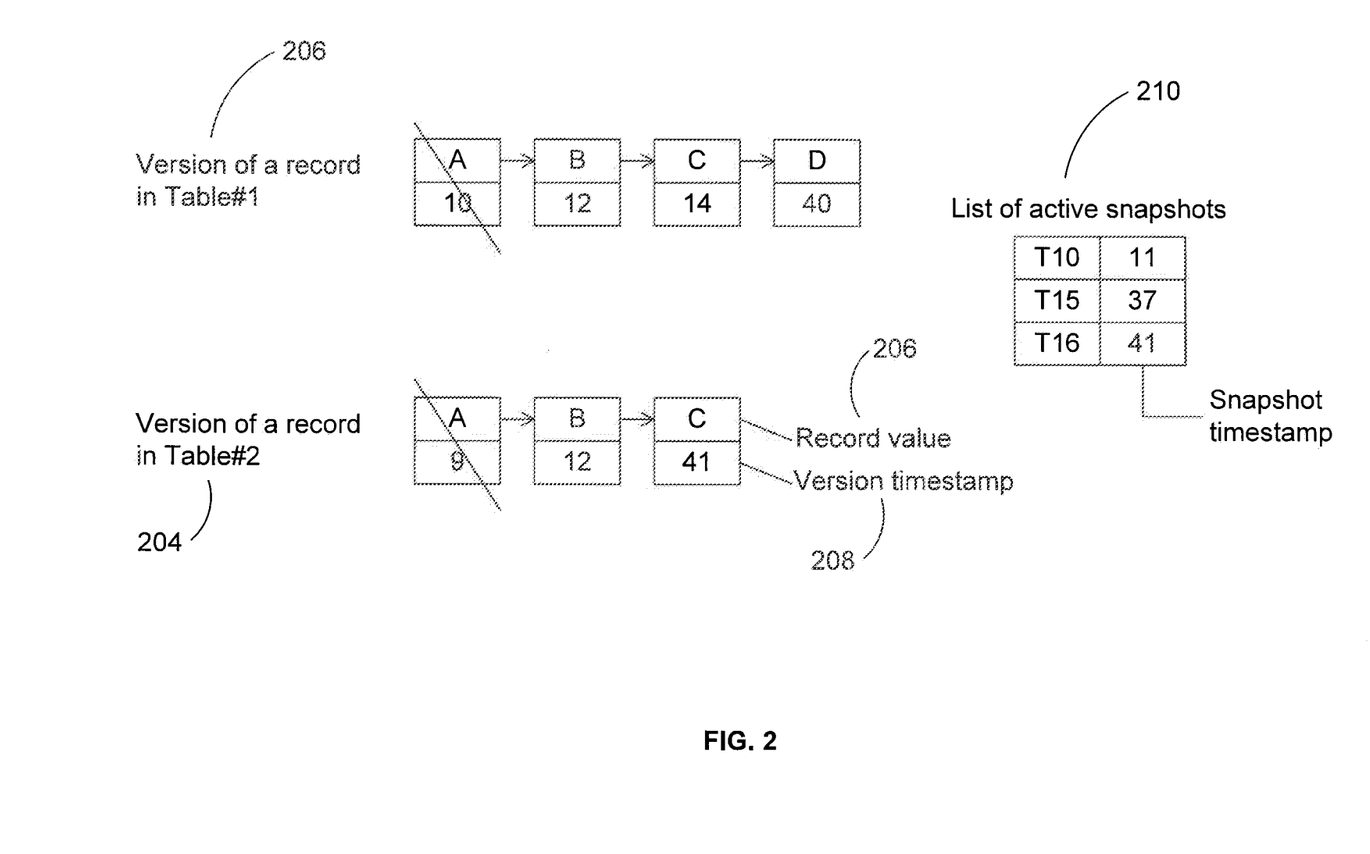
FIG. 2 illustrates garbage collection based on a list of active snapshots according to conventional garbage collection methods.

According to example embodiments, as shown in FIG. 2, garbage collection may be executed using version timestamps of active snapshots. A version timestamp may include a timestamp that indicates when a particular version was saved. However, the version timestamp is not limited to including a timestamp and may also be based on other values. As an example, each version timestamp may include a version number which indicates a time that the particular version was saved, i.e. a version number of 1.1.1 indicates that the version was saved at 1 A.M on the first of the month.

According to embodiments, each active snapshot includes a current commit timestamp value that is stored as a version timestamp for a version of a record. As shown in FIG. 2, a first record 202 in Table #1 may include record values A, B, C and D. However, the active snapshot may also include other values, and is not limited to including a timestamp value and a record value. A second record 204 may be stored in Table #2 and include record values A, B and C. Each record value 206 (e.g. A, B, C and D) may include a version timestamp 208. As an example, the versions of a first record 202 in Table #1 may include {A, 10}, {B, 12}, {C, 14} and {D, 40}. The versions of a second record 204 in Table #2 may include {A, 9}, {B, 12} and {C, 41}. In addition, as shown in FIG. 2, a list of active snapshots 210 may include a Transaction 10 ("T10") with a snapshot timestamp of 11, a Transaction 15 ("T15") with a snapshot timestamp of 37 and a Transaction 16 ("T16") with a snapshot timestamp of 41. A version garbage collector may determine a minimum timestamp for all active snapshots and compare the minimum version timestamp with each timestamp 208 for each record version. If a record version includes a timestamp that is earlier than the global minimum timestamp, there is no reason to continue to store this record version and the version garbage collector may delete the record version.

Garbage collection, e.g. version consolidation, may be done asynchronously to an event that makes a version obsolete. A transaction manager may be responsible for determining which data versions are obsolete and may be deleted during consolidation. As an example, two different methods may be used to determine obsolete versions. A row store engine may use commit sequence numbers (CID) while a column store engine may use transaction start sequence numbers (TID). Thus, the engine may ask the transaction manager for one of these values used to determine obsolete versions.

According to row store based embodiments, a MinReadCID may be used, which is a commit ID which corresponds to an oldest snapshot that must be kept because there is at least one active transaction that needs access to the oldest snapshot. An old version may be removed if the old version has a successor version that is part of that snapshot (successor version has CID<=MinReadCID).

According to column store based embodiments, a MinReadTID may be used. The MinReadTID is a maximum TID for which all changes written with a same or a lower TID may be shown to all active transactions. Versions may be deleted during version consolidation if they have a successor version that may be seen by all active transactions (successor version has TID<=MinReadTID).

Thus, as shown in FIG. 2, the global minimum timestamp is 11. The record version {A, 10} in Table #1 and the record version {A, 9} in Table #2 may be deleted or consolidated.

However, there may be long-running open cursors having a very long list of older active snapshots. According to the above example, version garbage collection may not result in deletion of many record versions because of an early global minimum timestamp. As a result, memory may be scarce and many version records may not be collected by the garbage collector. This may result in reduced performance when traversing large version chains of a record.

Garbage Collection using Multiple Levels of Active Snapshot Lists

Figure 3:
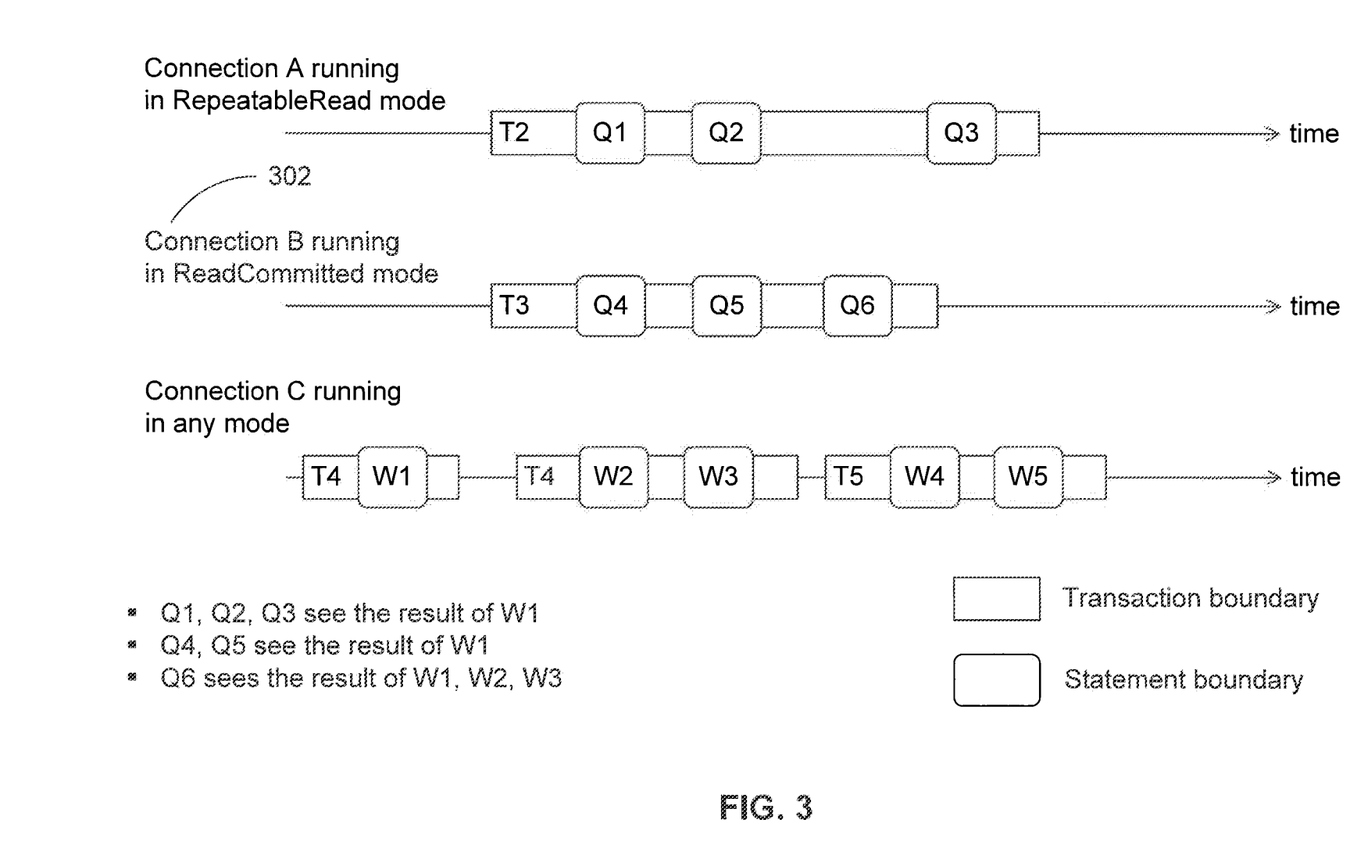
FIG. 3 shows transaction level snapshot isolation and statement level snapshot isolation modes according to example embodiments.

According to example embodiments, it may be advantageous to maintain a minimum snapshot value for each table. However, when a timestamp is assigned to a snapshot it may be difficult to determine which table will access the snapshot in the future. Thus, as shown in FIG. 3, two levels of active snapshot lists may be maintained, a first level for global snapshots and a second level for table-specific snapshots. Each snapshot may be inserted into the global snapshot list. However, at a later time, the snapshot may be moved from the global snapshot list to one of the local snapshot lists, e.g. a related table.

According to example embodiments, the database system may provide statement level snapshot isolation 302. For example, transactions may have an isolation level that is read committed, thereby reducing locking overhead for the system. A read committed isolation level utilizes read locks that are released once a related SELECT operation is performed. Each statement may see changes that were committed when execution of the statement started. Thus, any database transaction that is read committed may have an associated timestamp for completion of the SELECT operation.

As an example, if a cursor is opened for a table with an isolation level of read committed, it is possible to have statement level snapshot isolation. Thus, it is possible to determine that a snapshot will not be accessed by any other table within a same snapshot boundary. This is shown, for example, in FIG. 3. As provided in FIG. 3, Q6 which is in read committed mode may be able to see the result of each of W1, W2 and W3, three write transactions. Q1, Q2 and Q3 which are in repeatable read mode may only see the result of W1.

Figure 4:
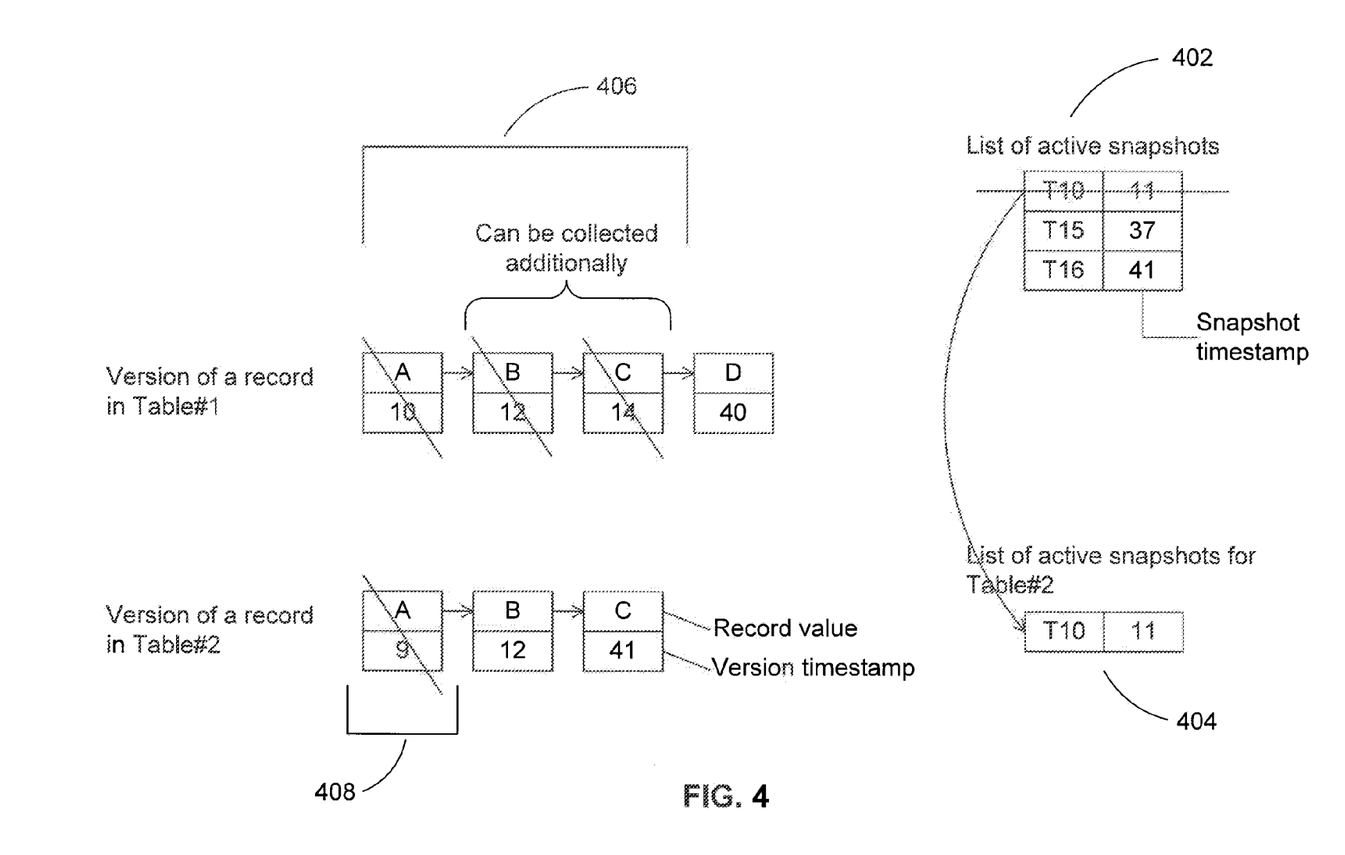
FIG. 4 illustrates a table-wise version garbage collection protocol based on dual minimum timestamps according to example embodiments.

As shown in FIG. 4, according to example embodiments, the in-memory database system may execute garbage collection or version consolidation. In FIG. 4, there is both a global active snapshot list 402 as well as a local active snapshot list 404 for Table #2. The version garbage collector may execute for Table #2 and use both a minimum timestamp from the global active snapshot list 402 as well as the local active timestamp list 404. As shown in FIG. 4, the minimum timestamp for Table #2 is 11 because the Transaction 10 is relocated from the global active snapshot list 402 to the local active time stamp list 404 for Table #2. This relocation is possible because the database system has opened a cursor for Table #2 with an isolation level of read committed, e.g. statement level snapshot isolation. However, as shown in FIG. 1, Table #1 does not have a local active snapshot list and the minimum snapshot timestamp is 37 for Table #1 based on the global active snapshot list 402. T10 is not applicable to Table #1. Thus, record values A, B and C 406 are deemed obsolete for Table #1 in view of the timestamp of 37 and record value A 408 is deemed obsolete for Table #2 in view of the timestamp of 11. As illustrated in FIG. 4, the garbage collector may collect {A, 10}, {B, 12} and {C, 14} from Table #1 and collect {A, 9} from Table #2.

Figure 5:
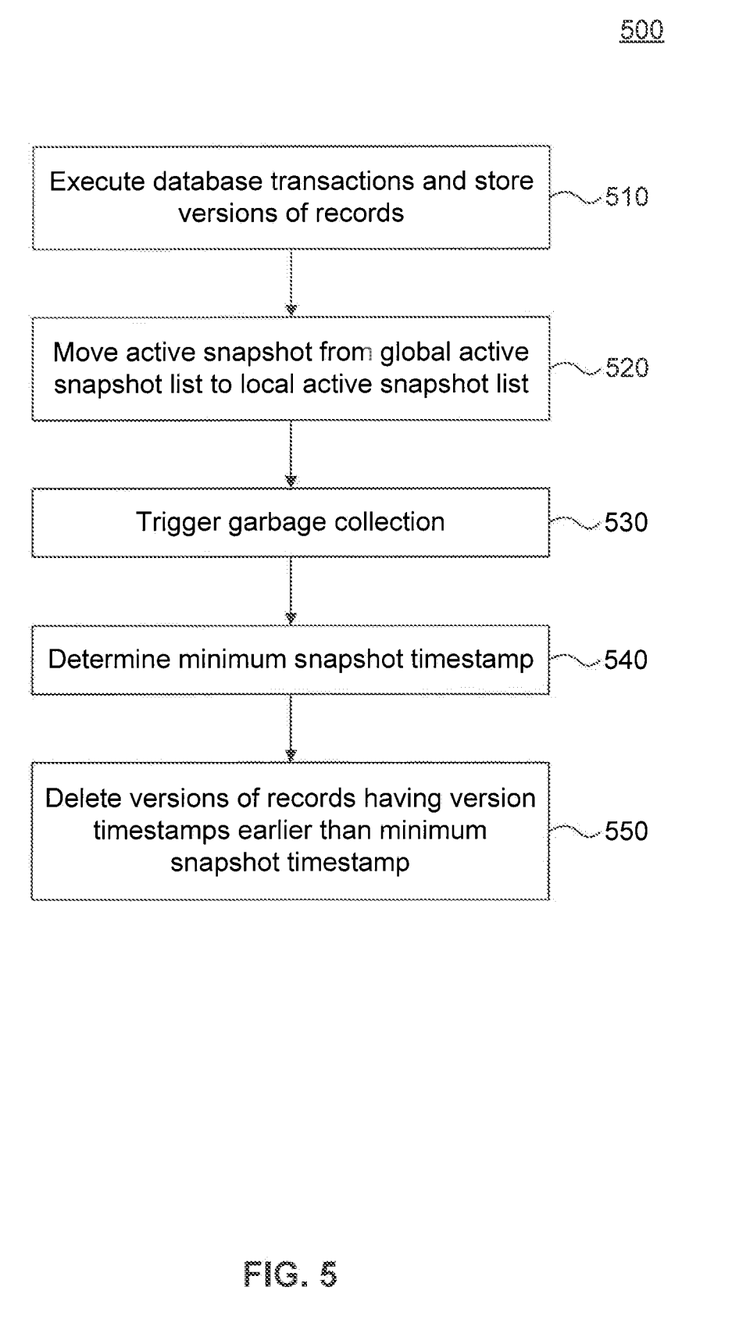
FIG. 5 illustrates a method of version garbage collection using snapshot lists according to example embodiments.

According to embodiments, FIG. 5 illustrates a method of version garbage collection using snapshot lists. According to example embodiments, a multi-core parallel processing in-memory database system may execute garbage collection to remove obsolete record versions from memory, e.g. version consolidation.

In step 510, database transactions are executed resulting in storage of versions of a record in database tables as well as snapshots of the database. Active snapshots are associated with a global active snapshot list. In step 520, the database system determines which table will access an active snapshot and the active snapshot may be moved from the global active snapshot list to a local active snapshot list which corresponds with a table. This movement of the active snapshot may be possible as a result of a read committed isolation level. In step 530, garbage collection may be triggered by the database system as a regular background job or may be explicitly triggered when a size limit for version memory is exceeded, or manually triggered by an administrator. In step 540, the garbage collector determines a minimum snapshot timestamp using both a local active snapshot list as well as the global active snapshot list. In step 550, the garbage collector deletes or consolidates versions of records which have a version timestamp that is earlier than the minimum snapshot timestamp.

According to advantages of example embodiments, both online transaction processing (OLTP) and online analytical processing (OLAP) workloads may be combined into a single in-memory database system. Therefore, there may be long-running open cursors (or snapshots) which include many version records. It is advantageous to reduce a number of existing versions in memory by executing garbage collection or version consolidation according to the example embodiments as shown in FIGS. 4 and 5. Obsolete versions of a record may be deleted from memory to make efficient usage of an in-memory database system.

Example Computer Implementation

Figure 6:
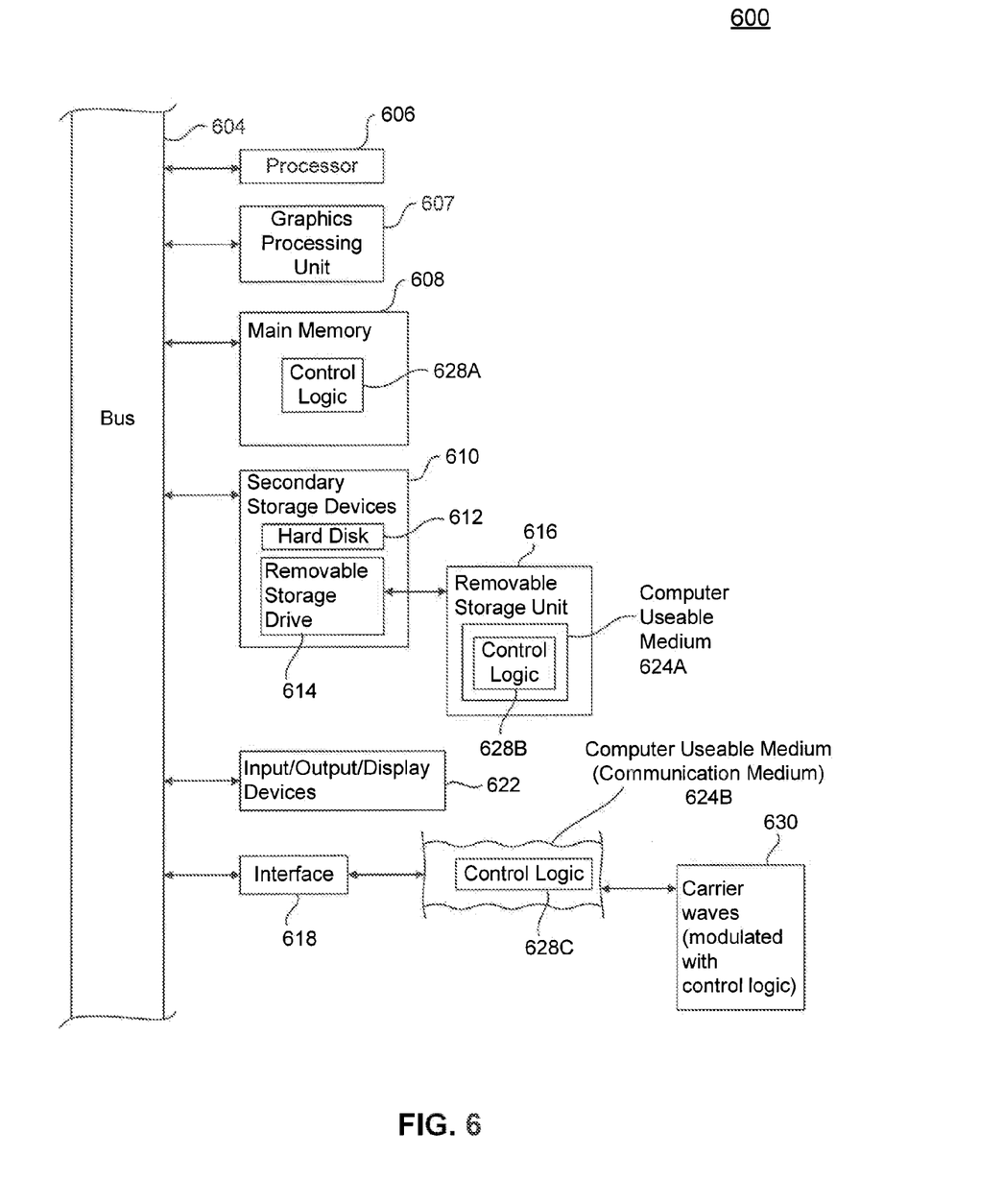
FIG. 6 illustrates an example computer system according to example embodiments.

In an example embodiment, the systems, methods and computer products described herein are implemented using well known computers, such as computer 600 shown in FIG. 6.

Computer 600 can be any commercially available and well known computer capable of performing the functions described herein, such as computers available from International Business Machines, Apple, Sun, HP, Dell, Compaq, Digital, Cray, etc.

Computer 600 includes one or more processors (also called central processing units, or CPUs), such as a processor 606.

The processor 606 is connected to a communication bus 604. Processors 606 may include any conventional or special purpose processor, including, but not limited to, digital signal processor (DSP), field programmable gate array (FPGA), and application specific integrated circuit (ASIC).

Computer 600 includes one or more graphics processing units (also called GPUs), such as GPU 607. GPU 607 is a specialized processor that executes instructions and programs selected for complex graphics and mathematical operations in parallel.

Computer 600 also includes a main or primary memory 608, such as random access memory (RAM). The primary memory 608 has stored therein control logic 628A (computer software), and data.

Computer 600 also includes one or more secondary storage devices 610. The secondary storage devices 610 include, for example, a hard disk drive 612 and/or a removable storage device or drive 614, as well as other types of storage devices, such as memory cards and memory sticks. The removable storage drive 614 represents a floppy disk drive, a magnetic tape drive, a compact disk drive, an optical storage device, tape backup, etc.

The removable storage drive 614 interacts with a removable storage unit 616. The removable storage unit 616 includes a computer useable or readable storage medium 624A having stored therein computer software 628B (control logic) and/or data. Removable storage unit 616 represents a floppy disk, magnetic tape, compact disk, DVD, optical storage disk, or any other computer data storage device. The removable storage drive 614 reads from and/or writes to the removable storage unit 616 in a well-known manner.

Computer 600 also includes input/output/display devices 622, such as monitors, keyboards, pointing devices, touchscreen displays, etc.

Computer 600 further includes a communication or network interface 618. The network interface 618 enables the computer 600 to communicate with remote devices. For example, the network interface 618 allows computer 600 to communicate over communication networks or mediums 624B (representing a form of a computer useable or readable medium), such as LANs, WANs, the Internet, etc. The network interface 618 may interface with remote sites or networks via wired or wireless connections.

Control logic 628C may be transmitted to and from computer 600 via the communication medium 624B. More particularly, the computer 600 may receive and transmit carrier waves (electromagnetic signals) modulated with control logic 630 via the communication medium 624B.

Any apparatus or manufacture comprising a computer useable or readable medium having control logic (software) stored therein is referred to herein as a computer program product or program storage device. This includes, but is not limited to, the computer 600, the main memory 608, the secondary storage devices 610, the removable storage unit 616 and the carrier waves modulated with control logic 630. Such computer program products, having control logic stored therein that, when executed by one or more data processing devices, cause such data processing devices to operate as described herein, represent embodiments of the disclosure.

The disclosure can work with software, hardware, and/or operating system implementations other than those described herein. Any software, hardware, and operating system implementations suitable for performing the functions described herein can be used.

Conclusion

It is to be appreciated that the Detailed Description section, and not the Summary and Abstract sections, is intended to be used to interpret the claims. The Summary and Abstract sections may set forth one or more, but not all, exemplary embodiments as contemplated by the inventors, and thus, are not intended to limit the disclosure and the appended claims in any way.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the specification is to be interpreted by the skilled artisan in light of the teachings and guidance.

The breadth and scope of the disclosure should not be limited by any of the above-described exemplary embodiments, but should be defined only in accordance with the following claims and their equivalents.

What is claimed is:

1. A method, comprising:
    locating, by at least one processor, a least-recently-active snapshot for a database table from a global active snapshot list and a table-specific active snapshot list, wherein the table-specific active snapshot list comprises a plurality of active snapshots relocated from the global active snapshot list to the table-specific active snapshot list,
        wherein the global active snapshot list is associated with a plurality of database tables including the database table,
        wherein the table-specific active snapshot list is associated with the database table, and
        wherein an active snapshot, generated by an active transaction, from the plurality of active snapshots was relocated by disassociating the active snapshot with the plurality of database tables and associating the active snapshot with the database table, wherein the relocation is based on an isolation level of the active transaction; and
    deleting, by the at least one processor, a snapshot version of a record in the database table if the snapshot version has a snapshot version timestamp earlier than a least-recently-active snapshot timestamp associated with the located least-recently-active snapshot.

2. The method of claim 1, wherein the active snapshot is relocated if the active transaction accesses the database table based on a read committed isolation level.

3. The method of claim 1, wherein the active snapshot is relocated if the active transaction accesses the database table based on statement level snapshot isolation.

4. The method of claim 1, further comprising:
    triggering the locating and the deleting as a regular background job, when a size limit for snapshot version memory is exceeded, or manually by an administrator.

5. The method of claim 1, further comprising:
storing, when executing a database transaction, an active snapshot generated by the database transaction into the global active snapshot list; and
relocating the active snapshot from the global active snapshot list to the table-specific active snapshot list by disassociating the active snapshot with the plurality of database tables and associating the active snapshot with the database table, wherein the relocation is performed based on the active transaction accessing the database table at an isolation level.

6. A system, comprising:
random access memory configured to store a plurality of database tables including a database table;
at least one processor configured to:
locate a least-recently-active snapshot for a database table from a global active snapshot list and a table-specific active snapshot list, wherein the table-specific active snapshot list comprises a plurality of active snapshots relocated from the global active snapshot list to the table-specific active snapshot list,
wherein the global active snapshot list is associated with a plurality of database tables including the database table,
wherein the table-specific active snapshot list is associated with the database table, and
wherein an active snapshot, generated by an active transaction, from the plurality of active snapshots was relocated by disassociating the active snapshot with the plurality of database tables and associating the active snapshot with the database table, wherein the relocation is based on an isolation level of the active transaction; and
delete, by the at least one processor, a snapshot version of a record in the database table if the snapshot version has a snapshot version timestamp earlier than a least-recently-active snapshot timestamp associated with the located least-recently-active snapshot.

7. The system of claim 6, wherein the active snapshot is relocated if the active transaction accesses the database table based on a read committed isolation level.

8. The system of claim 6, wherein the active snapshot is relocated if the active transaction accesses the database table based on statement level snapshot isolation.

9. The system of claim 6, the at least one processor further configured to:
trigger the locating and the deleting as a regular background job, when a size limit for snapshot version memory is exceeded, or manually by an administrator.

10. The system of claim 6, wherein the at least one processor if further configured to:
store, when executing a database transaction, an active snapshot generated by the database transaction into the global active snapshot list; and
relocate the active snapshot from the global active snapshot list to the table-specific active snapshot list by disassociating the active snapshot with the plurality of database tables and associating the active snapshot with the database table, wherein the relocation is performed based on the active transaction accessing the database table at an isolation level.

11. A computer-readable device having instructions stored thereon, execution of which, by at least one computing device, causes the at least one computing device to perform operations comprising:
locating, by at least one processor, a least-recently-active snapshot for a database table from a global active snapshot list and a table-specific active snapshot list, wherein the table-specific active snapshot list comprises a plurality of active snapshots relocated from the global active snapshot list to the table-specific active snapshot list,
wherein the global active snapshot list is associated with a plurality of database tables including the database table,
wherein the table-specific active snapshot list is associated with the database table, and
wherein an active snapshot, generated by an active transaction, from the plurality of active snapshots was relocated by disassociating the active snapshot with the plurality of database tables and associating the active snapshot with the database table, wherein the relocation is based on an isolation level of the active transaction; and
deleting, by the at least one processor, a snapshot version of a record in the database table if the snapshot version has a snapshot version timestamp earlier than the least-recently-active snapshot timestamp.

12. The computer-readable device of claim 11, wherein the active snapshot is relocated if the active transaction accesses the database table based on a read committed isolation level.

13. The computer-readable device of claim 11, wherein the active snapshot is relocated if the active transaction accesses the database table based on statement level snapshot isolation.

14. The computer-readable device of claim 11, the operations further comprising:
consolidating snapshot versions of the record by triggering the locating and the deleting as a regular background job, when a size limit for snapshot version memory is exceeded, or manually by an administrator.

15. The computer-readable device of claim 11, wherein the operations further comprise:
storing, when executing a database transaction, an active snapshot generated by the database transaction into the global active snapshot list; and
relocating the active snapshot from the global active snapshot list to the table-specific active snapshot list by disassociating the active snapshot with the plurality of database tables and associating the active snapshot with the database table, wherein the relocation is performed based on the active transaction accessing the database table at an isolation level.

* * * * *